United States Patent
Scott (10) Patent No.: US 12,536,908 B2
(45) Date of Patent: Jan. 27, 2026

(54) SYSTEMS AND METHODS FOR DETECTING PARKING SPOT NUMBERS FOR USE BY A MACHINE LEARNING MODEL TO PREDICT AVAILABLE SPOTS

(71) Applicant: Connaught Electronics Ltd., Tuam (IE)

(72) Inventor: Daniel Bartram Scott, Troy, MI (US)

(73) Assignee: Connaught Electronics Ltd. (IE)

(*) Notice: Subject to any disclaimer, the term of this patent is extended or adjusted under 35 U.S.C. 154(b) by 231 days.

(21) Appl. No.: 18/212,983

(22) Filed: Jun. 22, 2023

(65) Prior Publication Data

US 2024/0428684 A1 Dec. 26, 2024

(51) Int. Cl.
| | | |
|---|---|---|
| *G08G 1/14* | (2006.01) | |
| *G06T 11/60* | (2006.01) | |
| *G06V 10/774* | (2022.01) | |
| *G06V 20/56* | (2022.01) | |
| *G06V 20/58* | (2022.01) | |
| *G06V 20/62* | (2022.01) | |
| *G06V 30/18* | (2022.01) | |

(52) U.S. Cl.
CPC .............. *G08G 1/143* (2013.01); *G06T 11/60* (2013.01); *G06V 10/774* (2022.01); *G06V 20/586* (2022.01); *G06V 20/588* (2022.01); *G06V 20/63* (2022.01); *G06V 30/18* (2022.01); *G06V 2201/10* (2022.01)

(58) Field of Classification Search
CPC ...... G08G 1/143; G06T 11/60; G06V 10/774; G06V 20/586; G06V 20/588; G06V 20/63; G06V 30/18; G06V 2201/10
See application file for complete search history.

(56) References Cited

U.S. PATENT DOCUMENTS

| | | | |
|---|---|---|---|
| 2011/0261200 A1 | 10/2011 | Kanning et al. | |
| 2022/0345566 A1* | 10/2022 | Lee | H04M 1/72454 |
| 2023/0058856 A1* | 2/2023 | Inoue | G08G 1/142 |
| 2024/0144825 A1* | 5/2024 | Chiba | G08G 1/146 |
| 2024/0217507 A1* | 7/2024 | Yasuda | B60L 3/0084 |
| 2024/0257641 A1* | 8/2024 | Iguchi | G08G 1/148 |
| 2024/0290204 A1* | 8/2024 | Takino | B60W 30/06 |

FOREIGN PATENT DOCUMENTS

| | | |
|---|---|---|
| CA | 2916418 A1 | 6/2017 |
| KR | 102233440 B1 | 3/2021 |

* cited by examiner

*Primary Examiner* — Said Broome
*Assistant Examiner* — Andrew Shin
(74) *Attorney, Agent, or Firm* — Dickinson Wright PLLC (57) ABSTRACT

In some implementations, the device may include receiving, via an image sensor associated with a vehicle, an image of a parking area. In addition, the device may include determining that the image of the parking area includes an available parking spot; analyzing the image of the parking area to locate a number associated with the available parking spot; determining that the vehicle is entering the available parking spot; creating, in response to the vehicle entering the available parking spot, a generated image that includes the number associated with the available parking spot based on the image of the parking area; and displaying the generated image on a vehicle display in response to the vehicle occupying the available parking spot.

20 Claims, 6 Drawing Sheets

SYSTEMS AND METHODS FOR DETECTING PARKING SPOT NUMBERS FOR USE BY A MACHINE LEARNING MODEL TO PREDICT AVAILABLE SPOTS

TECHNICAL FIELD

The present disclosure relates to methods and systems for generating composite images of an environment outside of a motor vehicle, with specific emphasis.

BACKGROUND

To assist with identifying a parking spot, many parking areas use numbers to identify each spot. Often the parking spot number is used to facilitate paying for parking to a parking administrator. There is a need to automate detection and tracking of a user in a parking area based on parking spot identification numbers.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving, via an image sensor associated with a vehicle, an image of a parking area. Method may also include determining that the image of the parking area includes an available parking spot; analyzing the image of the parking area to locate a number associated with the available parking spot; determining that the vehicle is entering the available parking spot; creating, in response to the vehicle entering the available parking spot, a generated image that includes the number associated with the available parking spot based on the image of the parking area; and displaying the generated image on a vehicle display in response to the vehicle occupying the available parking spot.

Other embodiments of this aspect include corresponding computer systems, apparatus, and computer programs recorded on one or more computer storage devices, each configured to perform the actions of the methods.

Implementations may include one or more of the following features. Method where the available parking spot in recognized based on lines visible in the image of the parking area. Method where identification of the number associated with the available parking spot is determined via a processor programmed to perform optical character recognition. Method where the image of the parking area is received in response to the vehicle entering a parking-assist mode. Method may include: sending, to a user device, via a network, a notification which includes the generated image and the number associated with the available parking spot after a predetermined amount of time. Method where the predetermined amount of time is received, via an interface with a computing device associated with the parking area. Method may include: storing a metadata associated with the image of the parking area; training a machine learning model based on a stored image of the parking area, a stored number associated with the available parking spot, and the stored metadata associated with the image of the parking area; receiving, from the vehicle, a vehicle location and a current time; determining, by the machine learning model, at least one available parking spot based on the vehicle location and the current time; and displaying to an user, via the vehicle display, at least one available parking spot in the parking area associated with the vehicle location. Method may include: analyzing the image of the parking area to locate a special status associated with the available parking spot, where the special status may include at least one of a handicap privileges, a compact car privileges, and an electric charging privileges; receiving, from the user, a request to find an available parking spot having a special status; determining by the machine learning model, at least one available parking spot based on the vehicle location, the current time, and the special status; and displaying, on the vehicle display, the at least one available parking spot in the parking area associated with the vehicle location and the special status.

Implementations of the described techniques may include hardware, a method or process, or a computer tangible medium.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles (e.g., cars, trucks, vans, SUVs, etc.) can be equipped with a camera system that generates a top view on the vehicle display (e.g., infotainment screen, dashboard unit, tablet, mobile device, phone, etc.). The camera system may capture many different angles in relation to the vehicle and store images containing information that may be relevant to the user. In some instances, it may be beneficial to the user to access some of the images produced by the camera system when they are not in the vehicle.

For example, parking areas may require that the user pay for to park at a kiosk that is situated at a distance from the available parking spots in the parking area. In some instances, a kiosk may be available to process payment at the exit of a parking area. The parking kiosk may require a parking spot number to identify the parking spot occupied by the user's vehicle. In such a circumstance, it would be time consuming for the user to return to their parking spot to determine the number associated with their parking spot. The systems and methods described herein may be configured to send to a user an image which includes the parking area identification number so it is available after they leave the vehicle. This may be convenient when the parking spot identification number is positioned within the boundaries of the parking spot and is covered once the vehicle is parked. The user would be saved the effort of un-parking the vehicle to determine the identification number and re-parking it before returning to the payment kiosk.

In a further example, a user may enter a fuel station in order to purchase fuel. In some instances the user may be required to pay for fuel at a location distant from the fuel dispenser. Many fuel stations may require a number associated with the fuel dispenser in order to facilitate payment of the fuel. The systems and methods described herein may be configured to send to a user an image which includes the fuel station identification number so it is available after they leave the vehicle.

In a further example, the user may require a reminder of where they parked when they return to a parking area, which parking spot they parked their vehicle in. The systems and methods described herein may be configured to send a notification to the user, in response to their return to the parking area, the parking number associated with their parking spot and/or an image of their parking spot.

In some instances, a number associated with a parking spot may be on the ground, within the boundaries of the parking spot, outside the boundaries of the parking spot, on a wall adjacent to the parking spot, or on a sign adjacent to the parking spot. The camera system of the vehicle may capture any of these angles before, during, and after parking from one of a top view, side view, bird's eye view, and/or rear view. These images may be analyzed by a computer vision model to determine where the number is in relation to the parking spot. The systems and methods described herein may be configured to utilize optical character recognition in order to transform an image of the value which may be stored and sent to the user. In some embodiments, the user may receive an image of the number associated with the parking spot and/or the value of the number associated with the parking spot. In another embodiment, the special status and/or parking area of the parking spot may indicate a special time limit. The systems and methods described herein may send a notification to the user near the end of the time limit based on a determination that the user has parked in a parking spot having a time limit. Such information related to rules associated with parking spots such as time limits may be determined via an interface with a computing device associated with the parking area.

The systems and methods described herein may further utilize computer object recognition to identify objects adjacent to, or within the boundaries of the parking spot which may indicate a parking spot has a special status. For example, a special status may be indicated by a handicap sign, an electric charging point, a distinct symbol, a sign, text, or any other means of indicating that a parking spot has a special status. In some embodiments, the user may indicate they wish to park in a parking spot having a charging station, based on previous entries in the parking area, a machine learning model may predict the availability of such a spot based on historical trends.

Figure 1:
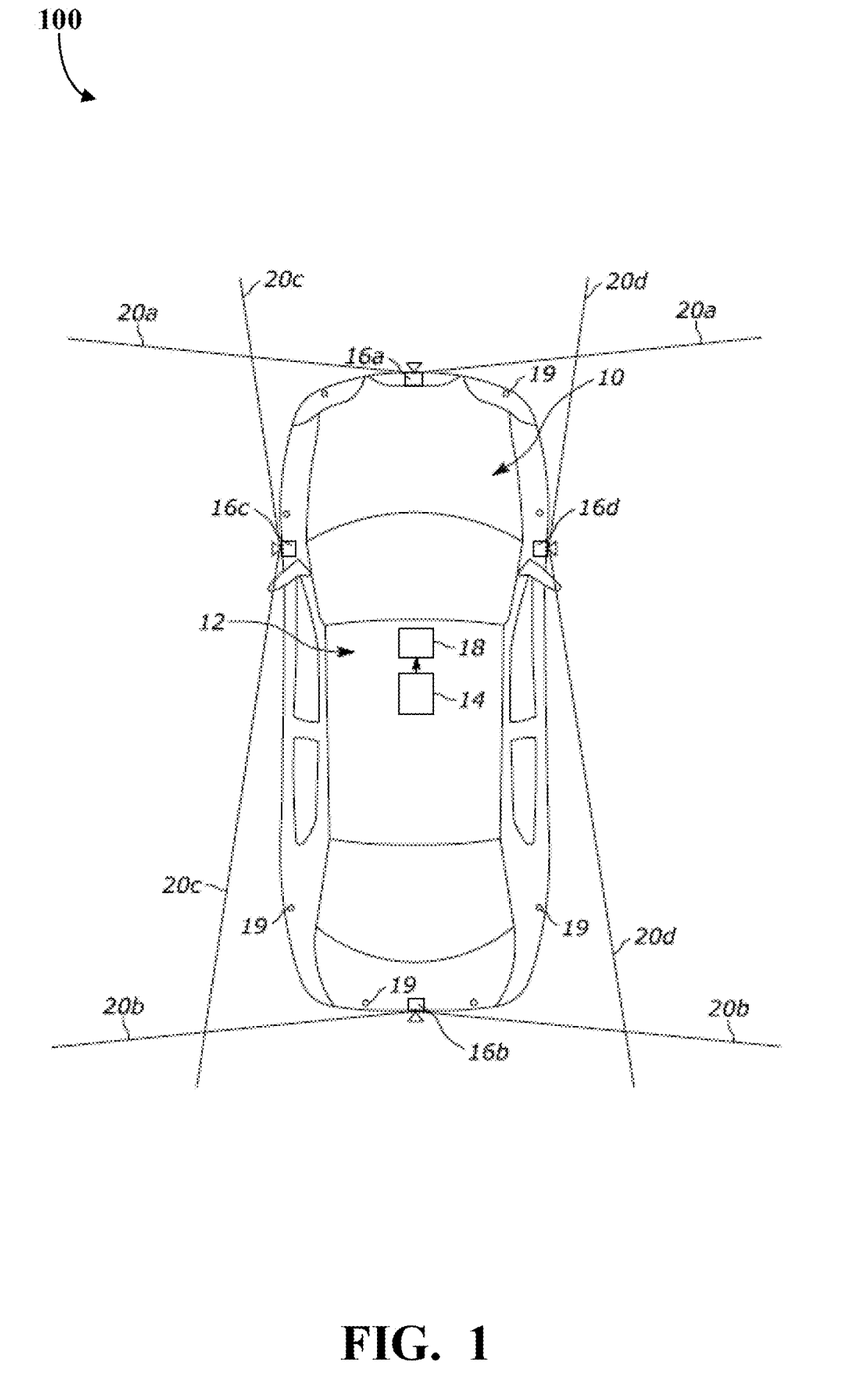
FIG. 1 illustrates a schematic of a vehicle according to an embodiment, shown here from a top view.

FIG. 1 illustrates a schematic 100 of a vehicle 10 according to an embodiment, shown here from a top view. The vehicle 10 is a passenger car, but can be other types of vehicles such as a truck, van, or sports utility vehicle (SUV), or the like. The vehicle 10 includes a camera system 12 which includes an electronic control unit (ECU) 14 connected to a plurality of cameras 16a, 16b, 16c, and 16d. In general, the ECU 14 includes one or more processors programmed to process the images data associated with the cameras 16a-d and generate a composite top view on a vehicle display 18. In addition, as will be described further below, the vehicle 10 includes a plurality of proximity sensors (e.g., ultrasonic sensors, radar, sonar, LiDAR, etc.) 19. The proximity sensors 19 can be connected to their own designated ECU that develops a sensor map of objects external to the vehicle. Alternatively, the proximity sensors can be connected to ECU 14.

The ECUs disclosed herein may more generally be referred to as a controller. In the case of an ECU of a camera system 12, the ECU can be capable of receiving image data from the various cameras (or their respective processors), processing the information, and outputting instructions to combine the image data in generating a composite top view, for example. In the case of an ECU associated with the proximity sensors 19, the ECU can be capable of receiving sensor data from the various proximity sensors (or their respective processors), processing the information, and outputting a sensor map of objects surrounding the vehicle; this ECU can also be capable of causing alerts to be sent to the driver during parking maneuvers that might warn the driver of the proximity of the detected objects. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured to, upon execution by the processor, cause the harmonization techniques and algorithms described herein.

In the schematic 100, the cameras 16-d are located about different quadrants of the vehicle, although more than four cameras may be provided in the camera system 12. Each camera 16a-d may have a fish-eye lens to obtain images with an enlarged field of view, indicated by boundary lines 20a-d. In an example, a first camera 16a faces an area in front of the vehicle, and captures images with a field of view indicated by boundary lines 20a. The first camera 16a can therefore be referred to as the front camera. A second camera 16b faces an area behind the vehicle, and captures images with a field of view indicated by boundary lines 20b. The second camera 16b can therefore be referred to as the rear camera. A third camera 16c faces an area on the left side of the vehicle, and captures images with a field of view indicated by boundary lines 20c. The third camera 16c can therefore be referred to as the left camera, or left-side camera. The third camera 16c can also be mounted on or near the vehicle's left wing mirror, and can therefore be referred to as a mirror left (ML) camera. A fourth camera 16d faces an area on the right side of the vehicle, and captures images with a field of view indicated by boundary lines 20d. The fourth camera 16d can therefore be referred to as the right camera, or right-side camera. The fourth camera 16d can also be mounted on or near the vehicle's right wing mirror, and can therefore be referred to as a mirror right (MR) camera. The images (or the associated image data) originating from the cameras 16a-d can be processed by the ECU 14 (e.g., stitched together, distorted, combined, and harmonized) to generate the composite top view on the vehicle display 18.

Figure 2:
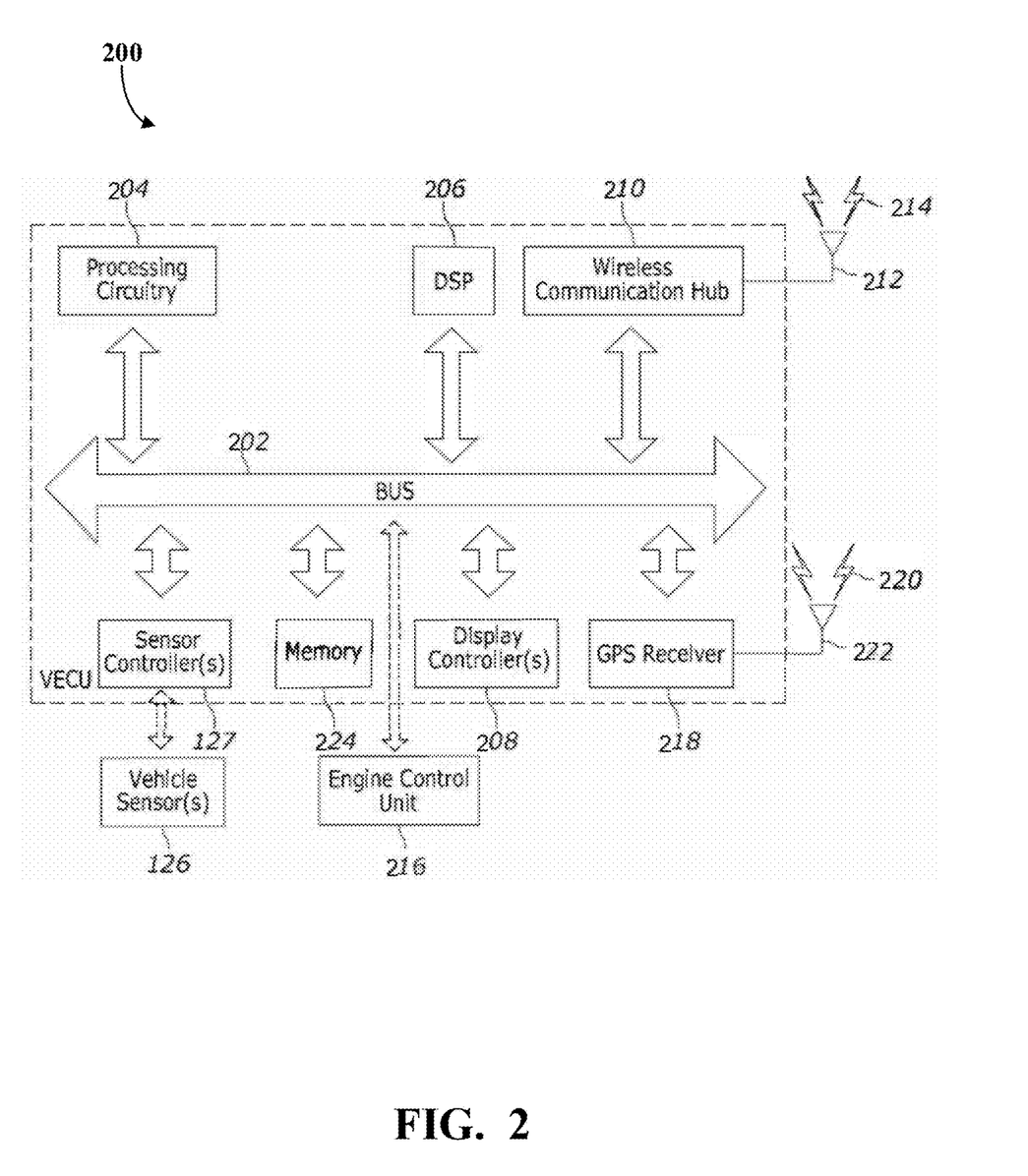
FIG. 2 is a block diagram of internal components of an exemplary embodiment of a computing system.

FIG. 2 is a block diagram of internal components of an exemplary embodiment of a computing system 200. The computing system 200 may include or be used to implement the computing systems described above. In this embodiment, the computing system 200 may be embodied at least in part in a vehicle electronics control unit (VECU). It should be noted that FIG. 2 is meant only to provide a generalized illustration of various components, any or all of which may be utilized as appropriate. It can be noted that, in some instances, components illustrated by FIG. 2 can be localized to a single physical device and/or distributed among various networked devices, which may be disposed at different physical locations.

The computing system 200 has hardware elements that can be electrically coupled via a BUS 202. The hardware elements may include processing circuitry 204 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 206, depending on desired functionality. The computing system 200 can also include one or more display controllers 208, which can control the display devices disclosed above, such as an in-vehicle touch screen, screen of a mobile device, and/or the like.

The computing system 200 may also include a wireless communication hub 210, or connectivity hub, which can include a modem, a network card, an infrared communication device, a wireless communication device, and/or a chipset (such as a Bluetooth device, an IEEE 802.11 device, an IEEE 802.16.4 device, a WiFi device, an LTE device, cellular communication facilities including 4G, 5G, etc.), and/or the like. The wireless communication hub 210 can permit data to be exchanged with network 114, wireless access points, other computing systems, etc. The communication can be carried out via one or more wireless communication antenna 212 that send and/or receive wireless signals 214.

The computing system 200 can also include or be configured to communicate with an engine control unit 216, or other type of controller 108 described herein. In the case of a vehicle that does not include an internal combustion engine, the engine control unit may instead be a battery control unit or electric drive control unit configured to command propulsion of the vehicle. In response to instructions received via the wireless communications hub 210, the engine control unit 216 can be operated in order to control the movement of the vehicle during, for example, a parking procedure.

The computing system 200 also includes vehicle sensors 126 such as those described above with reference to FIG. 1. These sensors can include, without limitation, one or more accelerometer(s), gyroscope(s), camera(s), radar(s), LiDAR(s), odometric sensor(s), and ultrasonic sensor(s), as well as magnetometer(s), altimeter(s), microphone(s), proximity sensor(s), light sensor(s), and the like. These sensors can be controlled via associated sensor controller(s) 127.

The computing system 200 may also include a GPS receiver 218 capable of receiving signals 220 from one or more GPS satellites using a GPS antenna 222. The GPS receiver 218 can extract a position of the device, using conventional techniques, from satellites of a GPS system, such as a global navigation satellite system (GNSS) (e.g., Global Positioning System (GPS)), Galileo, GLONASS, Compass, Galileo, Beidou and/or other regional systems and/or the like.

The computing system 200 can also include or be in communication with a memory 224. The memory 224 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 224 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

Figure 3:
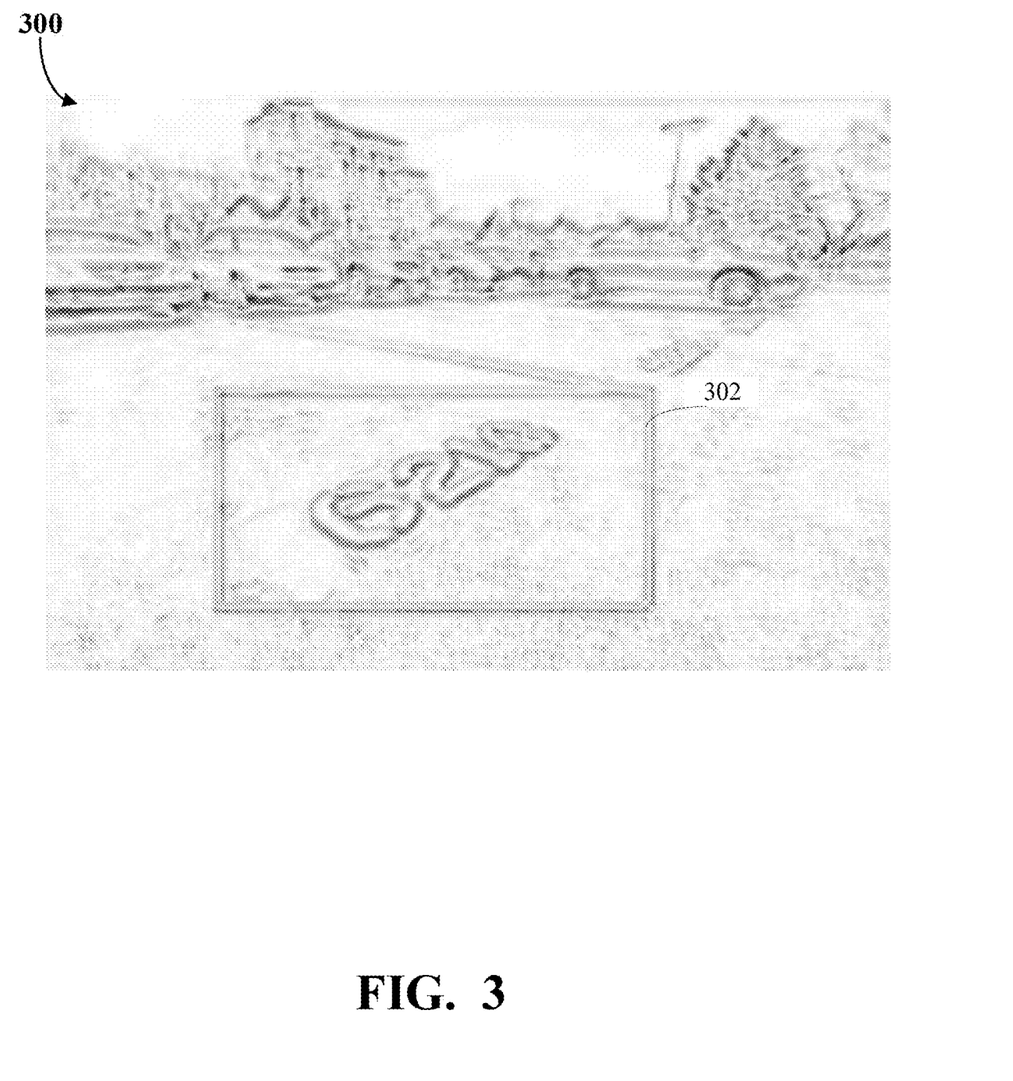
FIG. 3 is a flowchart of an example process which stores a parking spot identification number a vehicle has parked in, in accordance with the present disclosure.

FIG. 3 is an example image capture of a parking spot having a number associated therewith, which has been identified by the systems and methods described herein. In some embodiments, the image of the parking area may be captured by the vehicle sensors 126.

As shown in FIG. 3, an image 300 includes the boundaries of the available parking spot as well as a number associated with the parking spot. In some embodiments, the image may be apply optoelectronic image enhancement in low light condition (e.g., when inside a parking garage, when attempting to park at night, when attempting to park in a shady/dimly lit parking area). In some embodiments, the parking number may be displayed adjacent to the parking spot (e.g., on a sign associated with the parking spot, on a vertical wall adjacent to the parking spot).

As further shown in FIG. 3, the image 300 captured may be analyzed by optical character recognition. The optical character recognition may analyze the image and convert the number associated with the parking spot into a value which may be stored by the memory 224. In some embodiments, the systems and methods described herein may utilize multiple approaches to optical character recognition such as: non-neural approaches (e.g., viola-jones object detection framework, scale-invariant feature transform, histogram of oriented gradients, etc.), neural network approaches (e.g., region proposals, single shot multibox detector, you only look once, singe-shot refinement neural network, retina-net, deformable convolution networks, etc.), or any other appropriate image object detection approach.

As further shown in FIG. 3, a computer vision model may determine a subsection 302 of the image 300 which include the number associated with the parking spot. In some embodiments, the computer vision model may be used to determine the position within the image that the number associated with the parking spot is located. In some embodiments, the computer vision model may utilize approaches based on a convolution based neural networks (e.g., neural machine translation, deep convolutional generative adversarial networks, etc.) and a deep learning based machine learning models (e.g., you only look once detection model, conceptual model, etc.).

Figure 4:
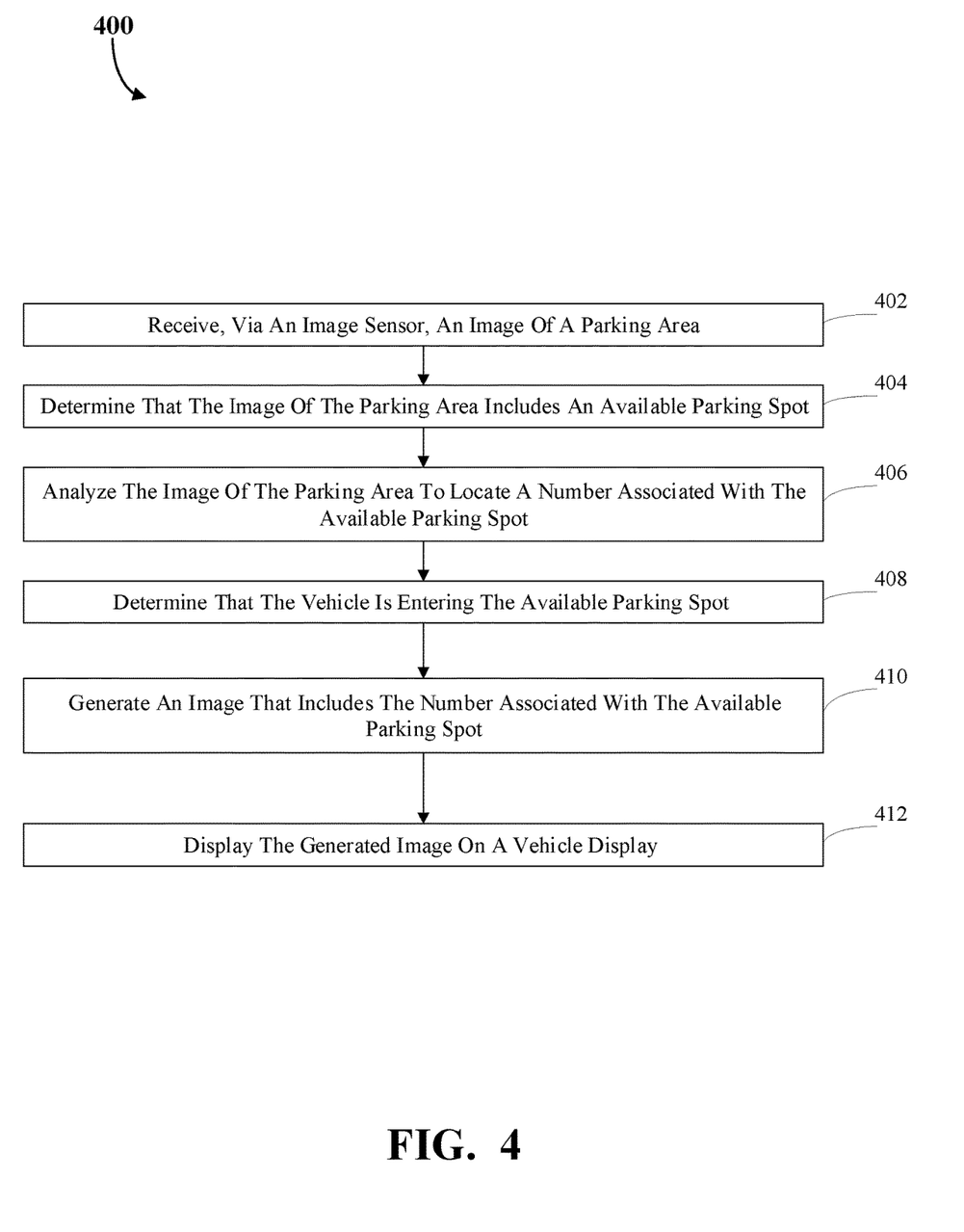
FIG. 4 is a flowchart of an example process for utilizing a machine learning model to predict available parking spots, in accordance with the present disclosure.

FIG. 4 is a flowchart of an example process 400 which stores a parking spot identification number a vehicle has parked in. In some implementations, one or more process blocks of FIG. 4 may be performed by the processing circuitry 204.

As shown in FIG. 4, process 400 may include receiving, via an image sensor associated with a vehicle, an image of a parking area (block 402). For example, process 400 may receive sensor data from proximity sensors 19 which may include but are not limited to image camera, video camera, ultrasonic sensors, radar, sonar, LiDAR, or any suitable sensor. In some embodiments, the data received from the image sensor may include video of the parking area captured from multiple angles which may be stitched together to form a single image or video (e.g., a birds eye view, front view, side view, side mirror view, rear view, etc.). In some embodiments, the receiving of images from the one or more image sensors may be triggered by the vehicle entering parking assist mode. In some embodiments, parking assist mode may be triggered in response to, the vehicle driving below a predetermined threshold (e.g., 5 miles per hour), upon manual activation by the user, upon entering a geo-fenced area known to be a parking area, or any appropriate indicator that the user is attempting to park. In some embodiments, a parking assist mode is not used, instead the one or more image sensors may be triggered in response to, the vehicle driving below a predetermined threshold (e.g., 5 miles per hour), upon manual activation by the user, upon entering a geo-fenced area known to be a parking area, or any appropriate indicator that the user is attempting to park.

As also shown in FIG. 4, process 400 may include determining, that the image of the parking area includes an available parking spot (block 404). For example, process 400 may detect lines on the driving surface which indicate a parking spot. In some embodiments, a parking spot may be detected based on interfacing with a computing device associated with the parking area, a sign, a symbol, or a mark associated with a parking spot, or any appropriate identifier of a parking spot.

As shown in FIG. 4, process 400 may include analyzing, the image of the parking area to locate a number associated with the available parking spot (block 406). For example, process 400 may analyze image data received from an image camera, video camera, ultrasonic sensors, radar, sonar, LiDAR, or any suitable sensor which includes the identified parking spot in order to detect a number associated with the parking spot. In some embodiments, the parking spot number may convert an image of a number into a stored value based on applying optical character recognition to the image. In some embodiments, the vehicle may interface with a computing device associated with the parking area to determine the parking spot number of the vehicle based on vehicle position. Vehicle position may be determined based on GPS, Wifi, Bluetooth beacons, cellular triangulation, any appropriate vehicle position determination, or some combination thereof.

As shown in FIG. 4, process 400 may include determining, that the vehicle is entering the available parking spot (block 408). For example, process 400 may determine based on image data being received via the imaging sensor that the vehicle has entered the parking spot by tracking the position of the vehicle with respect to lines indicating the boundaries of the parking spot. In some embodiments the position of the vehicle may be compared with other indicators of the boundaries of the parking spot which may include, but are not limited to, concrete dividers, sign posts, and digital barriers (i.e., geo-fencing, Bluetooth beacons, NFC boundaries, WIFI, cellular triangulation, interfacing with a computing device associated with the parking area, any appropriate means of determining a parking spot boundary, or some combination thereof.

As shown in FIG. 4, process 400 may include creating, in response to the vehicle entering the available parking spot, a generated image that includes the number associated with the available parking spot based on the image of the parking area (block 410). For example, process 400 may access stored image data obtained from the one or more image sensors received while the vehicle was driving up to and entering the available parking spot. The process 400 may generate an image based on the image data which includes a view of the parking spot and the number associated with the parking spot. In some embodiments, the generated image may include other indicators that the parking spot has a special status such as a handicap sign, an electric charging point, a distinct symbol, a sign, text, or any other means of indicating that a parking spot has a special status.

As shown in FIG. 4, process 400 may include displaying, the generated image on a vehicle display in response to the vehicle occupying the available parking spot (block 412). For example, process 400 may utilize any available display means associated with the vehicle including a heads up display, infotainment screen, dashboard unit, tablet, mobile device, phone, any appropriate display means, or some combination thereof. In a further example, the process 400 may determine, via an interface with a computing device associated with the parking area, that a time limit is associated with the parking spot. In some embodiments, the process 400 may alert the user of the time limit via notification to a user device. A notification may include, but is not limited to: an email, a text message, an application notification, instant message, audio message, online chat, internet chat relay, voice over internet protocol, or any appropriate form of network based communication.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
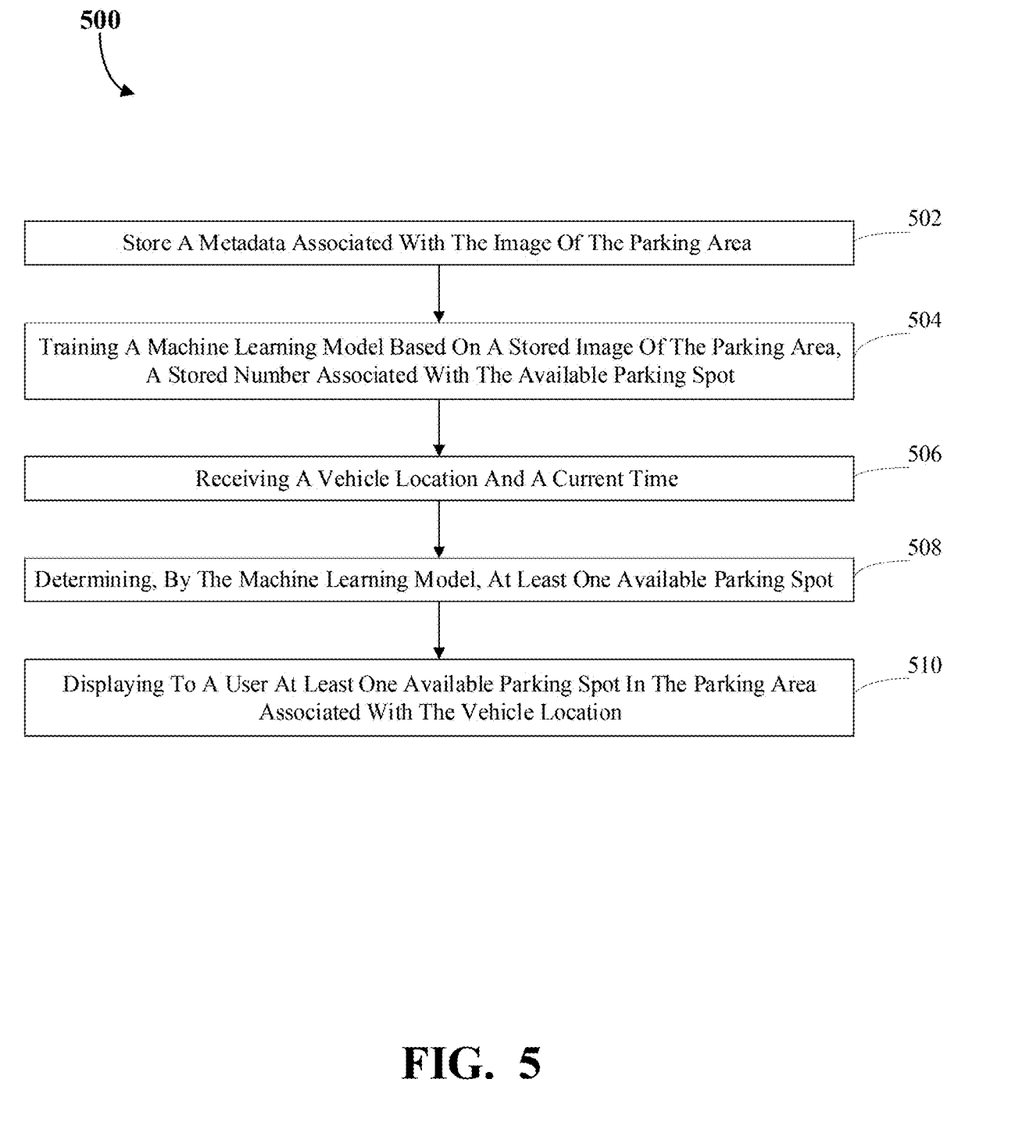
FIG. 5 is a flowchart of an example process for utilizing a machine learning model to predict available parking spots with special characteristics, in accordance with the present disclosure.

FIG. 5 is a flowchart of an example process 500 for utilizing a machine learning model to predict available parking spots. In some implementations, one or more process blocks of FIG. 5 may be performed by the processing circuitry 204.

As shown in FIG. 5 process 500 may include process storing a metadata associated with the image of the parking area (block 502). For example, process 500 may receive metadata associated with the one or more image sensors wherein the metadata associated with the image of the parking area includes at least one of: a time information, a location information, a lighting condition, a vehicle speed, a vehicle user, or any appropriate metadata associated with the images received from the one or more image sensors.

As shown in FIG. 5 process 500 may include training a machine learning model based on a stored image of the parking area, a stored number associated with the available parking spot, and the stored metadata associated with the image of the parking area (block 504). In some embodiments, a neural network may include, but is not limited to: a perceptron model, feed forward neural network, a convolution neural network, a radial basis functional neural network, a recurrent neural network, long short-term memory model, a sequence to sequence model, a modular neural network, an artificial neural network, or any appropriate neural network model.

In some embodiments, the one or more machine learning models may be trained using training data. The training data may include labeled inputs (e.g., parking metadata from previous users/instances of parking a vehicle) that are mapped to labeled outputs (e.g., the parking spot ultimately utilized by a user). Such training may be referred to as supervised learning. Additional types of training may be used, such as unsupervised learning where the training data is not labeled, and the machine learning models group clusters of the unlabeled training data based on patterns. The patterns may relate to certain characteristics being associated with certain probabilities of eligibilities than other probabilities. In addition, reinforcement learning may be used to train the one or more machine learning models, where a reward is associated with the models correctly determining a probability for one or more characteristics, such that the machine learning models reinforces (e.g., adjusts weights and/or parameters) selecting that probability for those characteristics. In some embodiments, some combination of supervised learning, unsupervised learning, and/or reinforcement learning may be used to train the one or more machine learning models.

As shown in FIG. 5 process 500 may include receiving, from the vehicle, a vehicle location and a current time (block 506). In some embodiments, process 500 may further receive information related to a user, the habits of the user, a history of parking spot availability over time, a history of a user's parking habits, a history of use of parking spots having special status, and other information related to historical trends of the user.

As shown in FIG. 5 process 500 may include determining, by the machine learning model, at least one available parking spot based on the vehicle location and the current time (block 508). For example, process 500 may determine which parking spots are available based on historical trends related to the parking area at the time the request is initiated. In some embodiments, the historical data may be collected from a variety of users and stored based on their association to the parking area. In some embodiments, the historical data may be stored at a server and sent over a network 114 and retrieved by the communication hub 210. In some embodiments, a portion of the historical data may be cached on the computing system 200 for use when a network is not available.

As shown in FIG. 5 process 500 may include displaying to a user, via the vehicle, at least one available parking spot in the parking area associated with the vehicle location (block 510). For example, process 500 may include displaying to the user a generated image based on one or more images captured by the one or more image sensors. In some embodiments, the generated image may overlay parking spot availability to the generated image which may include the number associated with the parking spot. In some embodiments, the display to the user may include a confidence level of the machine learning model prediction of availability of a parking spot. In some embodiments, the display may include the parking spot number associated with the available parking spot. In some embodiments, the process 500 may utilize any available display means associated with the vehicle including a heads up display, infotainment screen, dashboard unit, tablet, mobile device, phone, any appropriate display means, or some combination thereof.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
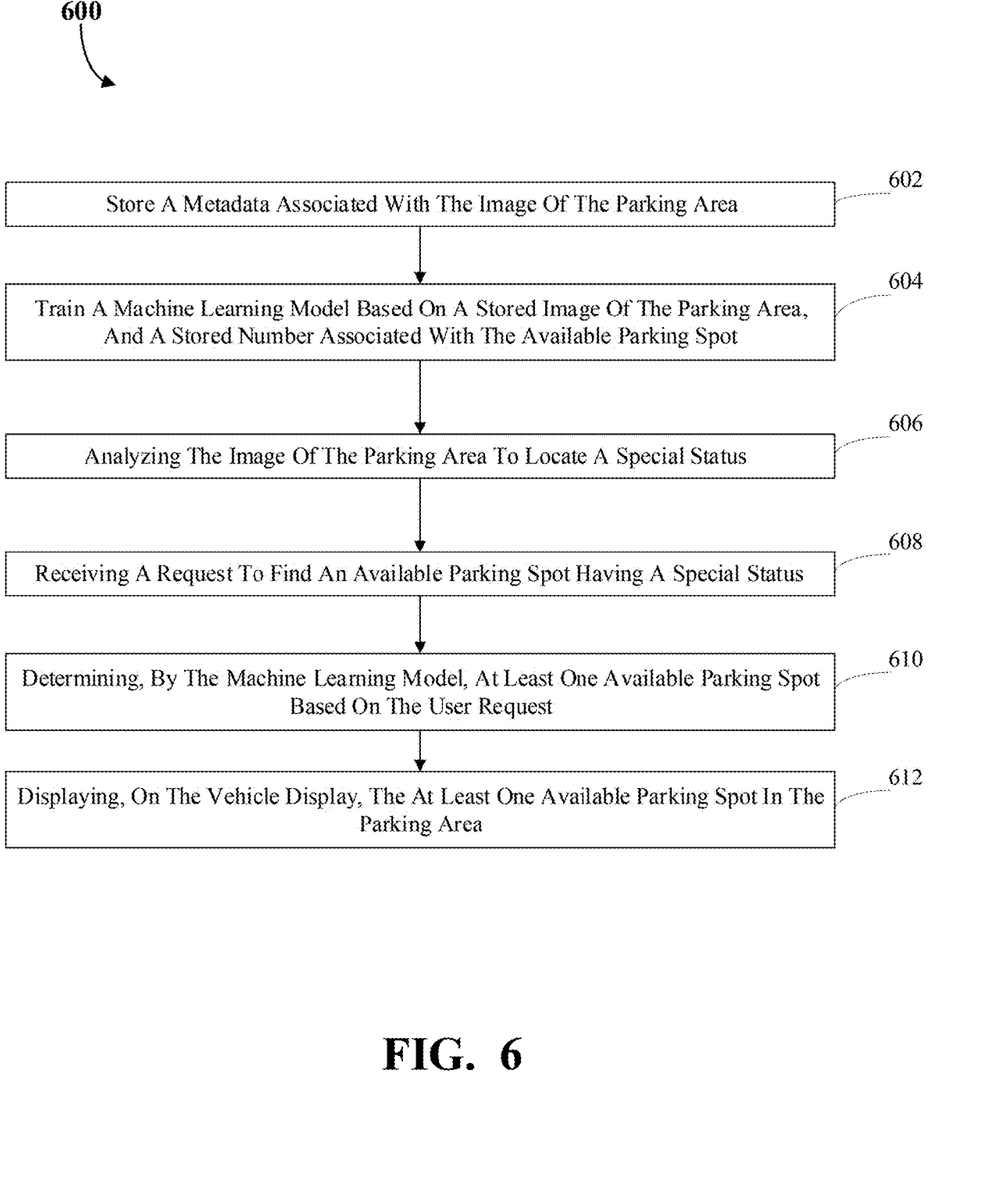

FIG. 6 is a flowchart of an example process 600 for utilizing a machine learning model to predict available parking spots with special characteristics. In some implementations, one or more process blocks of FIG. 6 may be performed by the processing circuitry 204.

As shown in FIG. 6, process 600 may include storing a metadata associated with the image of the parking area (block 602). For example, process 600 may receive metadata associated with the one or more image sensors wherein the metadata associated with the image of the parking area includes at least one of: a time information, a location information, a lighting condition, a vehicle speed, a vehicle user, or any appropriate metadata associated with the images received from the one or more image sensors.

As also shown in FIG. 6, process 600 may include training a machine learning model based on a stored image of the parking area, a stored number associated with the available parking spot, and the stored metadata associated with the image of the parking area (block 604). In some embodiments, a neural network may include, but is not limited to: a perceptron model, feed forward neural network, a convolution neural network, a radial basis functional neural network, a recurrent neural network, long short-term memory model, a sequence to sequence model, a modular neural network, an artificial neural network, or any appropriate neural network model.

In some embodiments, the one or more machine learning models may be trained using training data. The training data may include labeled inputs (e.g., parking metadata from previous users/instances of parking a vehicle) that are mapped to labeled outputs (e.g., the parking spot ultimately utilized by a user). Such training may be referred to as supervised learning. Additional types of training may be used, such as unsupervised learning where the training data is not labeled, and the machine learning models group clusters of the unlabeled training data based on patterns. The patterns may relate to certain characteristics being associated with certain probabilities of eligibilities than other probabilities. In addition, reinforcement learning may be used to train the one or more machine learning models, where a reward is associated with the models correctly determining a probability for one or more characteristics, such that the machine learning models reinforces (e.g., adjusts weights and/or parameters) selecting that probability for those characteristics. In some embodiments, some combination of supervised learning, unsupervised learning, and/or reinforcement learning may be used to train the one or more machine learning models.

As also shown in FIG. 6, process 600 may include analyzing the image of the parking area to locate a special status associated with the available parking spot, where the special status may include at least one of a handicap privileges, a compact car privileges, and an electric charging privileges (block 606). For example, process 600 may analyze images received from the one or more image sensors to identify markers which may indicate a special status. For example, a special status may include the special status may include at least one of a handicap privileges, a compact car privileges, and an electric charging privileges.

In some embodiments, an indicator of a special status may be a symbol within the boundaries of the parking spot, text within the boundaries of the parking spot, a sign associated with the parking spot, an electronic charging station within range of a parking spot, a specific color for the lines indicating the boundaries of the parking lot, a specific color of the text or number within the boundaries of the parking lot, or any other appropriate indicator of a special status of the parking lot.

In some embodiments, the process 600 may utilize image object detection by optical character recognition, non-neural approaches (e.g., viola-jones object detection framework, scale-invariant feature transform, histogram of oriented gradients, etc.), neural network approaches (e.g., region proposals, single shot multibox detector, you only look once, singe-shot refinement neural network, retina-net, deformable convolution networks, etc.), or any other appropriate image object detection approach.

As also shown in FIG. 6, process 600 may include receiving, from the user, a request to find an available parking spot having a special status (block 608). In some embodiments, process 600 may receive the user request via one or more display controllers 208, which can control the display devices disclosed above, such as an in-vehicle touch screen, screen of a mobile device, and/or the like.

As also shown in FIG. 6, process 600 may include determining, by the machine learning model, at least one available parking spot based on the vehicle location, the current time, and the special status (block 610). For example, process 600 may determine which parking spots are available based on historical trends related to the parking area at the time the request is initiated. In some embodiments, the historical data may be collected from a variety of users and stored based on their association to the parking area. In some embodiments, the historical data may be stored at a server and sent over a network 114 and retrieved by the communication hub 210. In some embodiments, a portion of the historical data may be cached on the computing system 200 for use when a network is not available.

As also shown in FIG. 6, process 600 may include displaying, on the vehicle display, the at least one available parking spot in the parking area associated with the vehicle location and the special status (block 612). For example, process 600 may include displaying to the user a generated image based on one or more images captured by the one or more image sensors. In some embodiments, the generated image may overlay parking spot availability to the generated image which may include the number associated with the parking spot. In some embodiments, the display to the user may include a confidence level of the machine learning model prediction of availability of a parking spot. In some embodiments, the display may include the parking spot number associated with the available parking spot. In some embodiments, the process 600 may utilize any available display means associated with the vehicle including a heads up display, infotainment screen, dashboard unit, tablet, mobile device, phone, any appropriate display means, or some combination thereof.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the systems and methods described herein that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for recognizing numbers associated with parking spots, the method comprising:

receiving, via an image sensor associated with a vehicle, an image of a parking area;

determining that the image of the parking area includes an available parking spot;

analyzing the image of the parking area to locate a physical number in the image associated with the available parking spot;

determining that the vehicle is entering the available parking spot;

creating, in response to the vehicle entering the available parking spot, a generated image that includes the physical number associated with the available parking spot based on the image of the parking area; and displaying the generated image on a vehicle display in response to the vehicle occupying the available parking spot.

2. The method of claim 1, wherein the available parking spot is recognized based on lines visible in the image of the parking area.

3. The method of claim 1, wherein identification of the physical number associated with the available parking spot is determined via a processor programmed to perform optical character recognition.

4. The method of claim 1, wherein the image of the parking area is received in response to the vehicle traveling at a speed below a predetermined threshold.

5. The method of claim 1, further comprising:

sending, to a user device, via a network, a notification which includes the generated image and the physical number associated with the available parking spot after a predetermined amount of time, where the predetermined amount of time indicates a time limit associated with the available parking spot.

6. The method of claim 5, wherein the predetermined amount of time is received, via an interface with a computing device associated with the parking area.

7. The method of claim 1, further comprising:

storing a metadata associated with the image of the parking area;

training a machine learning model based on a stored image of the parking area, a stored number associated with the available parking spot, and the stored metadata associated with the image of the parking area;

receiving, from the vehicle, a vehicle location and a current time;

determining, by the machine learning model, an at least one available parking spot based on the vehicle location and the current time; and displaying to a user, via the vehicle display, the at least one available parking spot in the parking area associated with the vehicle location.

8. The method of claim 7, further comprising:

analyzing the image of the parking area to locate a special status associated with the available parking spot, wherein the special status may include at least one of a handicap privileges, a compact car privileges, and an electric charging privileges;

receiving, from the user, a request to find the available parking spot having the special status;

determining, by the machine learning model, the at least one available parking spot based on the vehicle location, the current time, and the special status; and displaying, on the vehicle display, the at least one available parking spot in the parking area associated with the vehicle location and the special status.

9. A device for recognizing numbers associated with parking spots comprising:

one or more processors configured to:
- receive, via an image sensor associated with a vehicle, an image of a parking area;
- determine that the image of the parking area includes an available parking spot;
- analyze the image of the parking area to locate a physical number in the image associated with the available parking spot;
- determine that the vehicle is entering the available parking spot;
- create, in response to the vehicle entering the available parking spot, a generated image that includes the physical number associated with the available parking spot based on the image of the parking area; and
- display the generated image on a vehicle display in response to the vehicle occupying the available parking spot.

10. The device of claim 9, wherein the available parking spot is recognized based on lines visible in the image of the parking area.

11. The device of claim 9, wherein identification of the physical number associated with the available parking spot is determined via a processor programmed to perform optical character recognition.

12. The device of claim 9, wherein the image of the parking area is received in response to the vehicle traveling at a speed below a predetermined threshold.

13. The device of claim 9, wherein the one or more processors are further configured to:
- send, to a user device, via a network, a notification which includes the generated image and the physical number associated with the available parking spot after a predetermined amount of time, where the predetermined amount of time indicates a time limit associated with the available parking spot.

14. The device of claim 13, wherein the predetermined amount of time is received, via an interface with a computing device associated with the parking area.

15. The device of claim 9, wherein the one or more processors are further configured to:
- store a metadata associated with the image of the parking area;
- train a machine learning model based on a stored image of the parking area, a stored number associated with the available parking spot, and the stored metadata associated with the image of the parking area;
- receive, from the vehicle, a vehicle location and a current time;
- determine, by the machine learning model, an at least one available parking spot based on the vehicle location and the current time; and
- display to a user, via the vehicle display, the at least one available parking spot in the parking area associated with the vehicle location.

16. The device of claim 15, wherein the one or more processors are further configured to:
- analyze the image of the parking area to locate a special status associated with the available parking spot, wherein the special status may include at least one of a handicap privileges, a compact car privileges, and an electric charging privileges;
- receive, from the user, a request to find the available parking spot having the special status;
- determine, by the machine learning model, the at least one available parking spot based on the vehicle location, the current time, and the special status; and
- display, on the vehicle display, the at least one available parking spot in the parking area associated with the vehicle location and the special status.

17. A system for recognizing numbers associated with parking spots comprising:
one or more processors configured to:
- receive, via an image sensor associated with a vehicle, an image of a parking area;
- determine that the image of the parking area includes an available parking spot;
- analyze the image of the parking area to locate a physical number in the image associated with the available parking spot;
- determine that the vehicle is entering the available parking spot;
- create, in response to the vehicle entering the available parking spot, a generated image that includes the physical number associated with the available parking spot based on the image of the parking area; and
- display the generated image on a vehicle display in response to the vehicle occupying the available parking spot.

18. The system of claim 17, wherein the one or more processors are further configured to:
- send, to a user device, via a network, a notification which includes the generated image and the physical number associated with the available parking spot after a predetermined amount of time, where the predetermined amount of time indicates a time limit associated with the available parking spot.

19. The system of claim 17, wherein the one or more processors are further configured to:
- store a metadata associated with the image of the parking area;
- train a machine learning model based on a stored image of the parking area, a stored number associated with the available parking spot, and the stored metadata associated with the image of the parking area;
- receive, from the vehicle, a vehicle location and a current time;
- determine, by the machine learning model, an at least one available parking spot based on the vehicle location and the current time; and
- display to a user, via the vehicle display, the at least one available parking spot in the parking area associated with the vehicle location.

20. The system of claim 19, wherein the one or more processors are further configured to:
- analyze the image of the parking area to locate a special status associated with the available parking spot, wherein the special status may include at least one of a handicap privileges, a compact car privileges, and an electric charging privileges;
- receive, from the user, a request to find the available parking spot having the special status;
- determine, by the machine learning model, the at least one available parking spot based on the vehicle location, the current time, and the special status; and
- display, on the vehicle display, the at least one available parking spot in the parking area associated with the vehicle location and the special status.

* * * * *